(No Model.)

H. W. SCATTERGOOD.
TIME RECORD BOOK.

No. 461,098. Patented Oct. 13, 1891.

WITNESSES
F. L. Ourand
E. A. Finnell

INVENTOR
Henry Wilson Scattergood.
by Wm. N. Finnell
his Attorney

THE NORRIS PETERS CO., PHOTO-LITHO., WASHINGTON, D. C.

UNITED STATES PATENT OFFICE.

HENRY WILSON SCATTERGOOD, OF PHILADELPHIA, PENNSYLVANIA.

TIME-RECORD BOOK.

SPECIFICATION forming part of Letters Patent No. 461,098, dated October 13, 1891.

Application filed December 22, 1890. Serial No. 375,459. (No model.)

*To all whom it may concern:*

Be it known that I, HENRY WILSON SCATTERGOOD, a citizen of the United States, residing at Philadelphia, in the county of Philadelphia and State of Pennsylvania, have invented a certain new and useful Improvement in Time and Trial-Balance Books, of which the following is a full, clear, and exact description.

The object of this invention is to provide paymasters, bookkeepers, and others with a convenient and labor-saving medium for keeping their records.

The principle of the invention consists in the use of what I term a "permanent" page or sheet and a "transient" or slip page or sheet which tally and give a result when read together, the transient sheet being detachable from the permanent sheet and replaceable by a similar fresh sheet so long as the permanent sheet is available for the purposes of the record. As will appear presently, this principle is applicable in the construction of time-books, trial-balance books, and for analogous purposes.

For convenience of illustration I have shown my invention in the accompanying drawings as applied to a time-book for paymasters.

I will describe the principle of my invention first, and then particularly point out and distinctly claim the part or improvement which I claim as my invention.

In the said drawings, in the several figures of which like parts are similarly designated, Figure 1 is a plan view of the two sheets, the lower left-hand corner of the slip-sheet being turned over. Fig. 2 is an edge view, and Fig. 3 is a plan, of a permanent sheet ruled differently from that shown in Fig. 1.

In the example of my invention shown in $d$, Fig. 1 the permanent sheet $a$ has a column containing numerals, and a column $c$ to receive names of employés, which are set opposite the numerals. The numerals therefore may be elsewhere used to designate the employés, and thus save the labor of writing their names. There may be used another column $d$ on sheet $a$ to receive, for example, the amount of the weekly or other wages or to receive a check-number when the employés are required to use a check for arrival and departure, or both columns may be used. The remainder of the sheet may be ruled to receive other items of a permanent nature, or it may be blank to receive such memoranda as necessity or convenience dictate. The transient or slip sheet $e$ is narrower than the permanent sheet by the width of the name and reference-number columns—that is to say, it covers the permanent sheet up to the name-column—and this transient sheet is ruled with columns $f$ for the amount paid, $g$ for the reference-numbers, $h$ for the rate per week, $i$ for the work-days, and $j$ for remarks. By arranging the reference-numbers column and the wages-column of the slip-sheet next to the name-column on the permanent sheet the paymaster has these main items in ready juxtaposition for quick reading. Both sheets are provided at their bottoms with characters, as numerals $k$ and $l$, to identify them one with the other, and the slip-sheets are further designated by the calendar period they cover. Thus as one slip-sheet is filled another may be put in its place next the permanent sheet so long as such permanent sheet is a correct register, and, finally, when the permanent sheet is no longer available it may be filed away with the slip-sheets it has been employed with, first indicating thereon the period covered by it, and, if desired, also the number of slip-sheets used with it, and thus the series of slip-sheets and the permanent sheet with which they have been used become a ready reference-book for the future. For the purpose of readily distinguishing the permanent sheet from the slip-sheets the former may be of better paper than the latter and may be of a different color from them. When these sheets are placed in numbers in a temporary binder and there are a number of permanent sheets equal to as many different shop or pay rolls as may exist in the establishment where used, the name side of the permanent sheet may be thicker than the remainder, as at $m$, Fig. 2, so as to secure a uniform thickness throughout the book. This increase of thickness is chiefly necessary at the place where the sheets are held together, as in a binder or cover, and it may be secured in the manufacture of the paper or by pasting a strip on it or otherwise constructing either of the sheets. The sheets may be bound together in book form and any usual provision be made for removing the slip-sheets one by one.

In an application, Serial No. 375,460, of even date for a patent for temporary binders I have shown a cover admirably adapted to receive these sheets. It is provided with posts, and the sheets, as here shown, are manufactured with the holes $n$ to fit these posts, and clasps are provided on the cover to bind it and the sheets together; but I do not limit my invention to its use in any kind of cover.

As shown in Fig. 3, the permanent sheet may have the reference-number column $b$ and check-number column $d$ at the left of the name-column $c$ and the rate per week or hour column $o$ at the right of the said name-column, and said sheet may be ruled with parallel and adjoining columns $p$ and $q$ to receive, respectively, the dates of beginning and ceasing employment, and also ruled with a remarks-column $r$.

I do not limit my invention to any peculiarities of ruling, but I do esteem it of importance that the devices used to designate the employés in a wage-sheet or to indicate accounts in a trial-balance sheet should be in immediate proximity in the permanent and the slip sheets, for thereby they may be most conveniently and readily compared and read.

As already indicated, the sheets will be ruled to express most conveniently and readily the uses and purposes for which they are manufactured, the essential feature of the invention being a permanent sheet containing a fixed or relatively permanent record, and the slip-sheet containing only sufficient of the permanent record to identify it with the permanent sheet and being of less width than the permanent sheet by substantially the space occupied by the permanent record.

As indicated by dotted lines in Fig. 3, instead of using the holes to fit over the posts I may cut them out to the edge of the sheets and slip the sheets in on a curve and afterward straighten them out to engage the posts. This will be an advantage in filing in order to get each sheet with its corresponding number.

What I claim is—

1. A sheet for the reception of a fixed or permanent record, and a sheet of less width than the first-named sheet by substantially the space to contain the permanent record and marked to receive a duplicate of sufficient of the permanent record to identify it with the permanent-record sheet and adapted to receive a record to be completed by reading in connection with the permanent record and designed when filled to be disconnected from the permanent-record sheet, substantially as described.

2. A sheet of a given color for the reception of a record which in its nature is fixed or permanent, and a sheet of another color narrower than the permanent-record sheet by substantially the space on the permanent-record sheet to be occupied by the permanent record and to be marked with a duplicate of sufficient of the permanent record to identify it with the permanent-record sheet and adapted to receive a record to be completed by reading in connection with the permanent record and designed when filled to be disconnected from the permanent-record sheet at pleasure, substantially as described.

3. A sheet for the reception of a record which in its nature is fixed or permanent and having adjoining parallel columns to receive its several items, and a slip-sheet narrower than the permanent sheet by substantially the space on the permanent sheet which is to be covered by the fixed record and supplied with a suitable number of columns on its edge next the record-columns of the permanent sheet, which columns are to receive characters or items to identify the slip-sheet and its record with the permanent sheet and the record thereon, the two sheets being disunited or separate, substantially as described.

4. A sheet of unequal thickness, the thicker portion being arranged to receive a record which in its nature is fixed or permanent, and a slip-sheet narrower than the first-named sheet by substantially the thicker portion thereof and arranged to receive a duplicate of sufficient of the permanent record to identify the two sheets one with the other, substantially as described.

In testimony whereof I have hereunto set my hand this 20th day of December, A. D. 1890.

HENRY WILSON SCATTERGOOD.

Witnesses:
GEORGE BARNETT,
SAMUEL E. CARVER.